United States Patent [19]

Simpson et al.

[11] 4,025,769

[45] May 24, 1977

[54] APPARATUS FOR CONVOLUTING COMPLEX FUNCTIONS EXPRESSED AS FOURIER SERIES

[75] Inventors: Robert E. Simpson, Santa Clara; Evor Silvio Vattuone, San Jose, both of Calif.

[73] Assignee: The Singer Company, Binghamton, N.Y.

[22] Filed: July 7, 1975

[21] Appl. No.: 593,348

[52] U.S. Cl. .................................. 235/156; 235/181
[51] Int. Cl.² .......................................... G06F 15/34
[58] Field of Search .......... 235/156, 159, 160, 164, 235/181; 343/100 CL

[56] References Cited

UNITED STATES PATENTS

| | | | |
|---|---|---|---|
| 3,553,722 | 1/1971 | Ott ...................... | 235/156 |
| 3,586,843 | 6/1971 | Sloane ................. | 235/156 |
| 3,748,451 | 7/1973 | Ingwersen ............ | 235/156 |
| 3,778,606 | 12/1973 | Schmitt et al. ....... | 235/156 |

*Primary Examiner*—David H. Malzahn
*Attorney, Agent, or Firm*—Paul Hentzel; James C. Kesterson

[57] ABSTRACT

The azimuth beamspread smear effect in a radar image is simulated by convoluting a terrain function with an antenna gain function for each sweep that the target object is within the antenna gain bandwidth. The initial grid map of elevation-reflectance terrain data is combined with aircraft position and antenna orientation data to provide composite terrain data required to compute a terrain function along each range arc. Each radar sweep generates a data raster of composite terrain data for the R range points within that sweep. The antenna bandwidth is a small sector, M sweeps wide, which moves across the scanned sector as the antenna rotates forming R range arcs. A constantly changing block of composite terrain data for the M sweeps and R points must be continuously maintained to generate the beamspread smear by convolution of the terrain function and the antenna function. The MxR block of terrain data is held in the form of a Fourier series for each range arc. Each range arc Fourier series requires a (2N+1) memory capacity (N sine terms, plus N cosine terms, plus one constant term). The total memory requirement for the MxR data block in Fourier series form is (2N+1)R. The terrain Fourier series for each point along the target range arc is multiplied by the antenna gain at that point (also expressed as a Fourier series) to provide the terrain-gain point product, or return signal power for that point. The terrain function Fourier series constantly changes as the antenna rotates, and is generated from the composite terrain data through an updating technique in which a new leading sweep is added to the MxR block and the previous trailing sweep is dropped. The antenna gain pattern is typically symmetrical and has a Fourier series with N term plus a constant. The antenna function is fixed for each antenna model, mode and operating circumstance.

19 Claims, 9 Drawing Figures

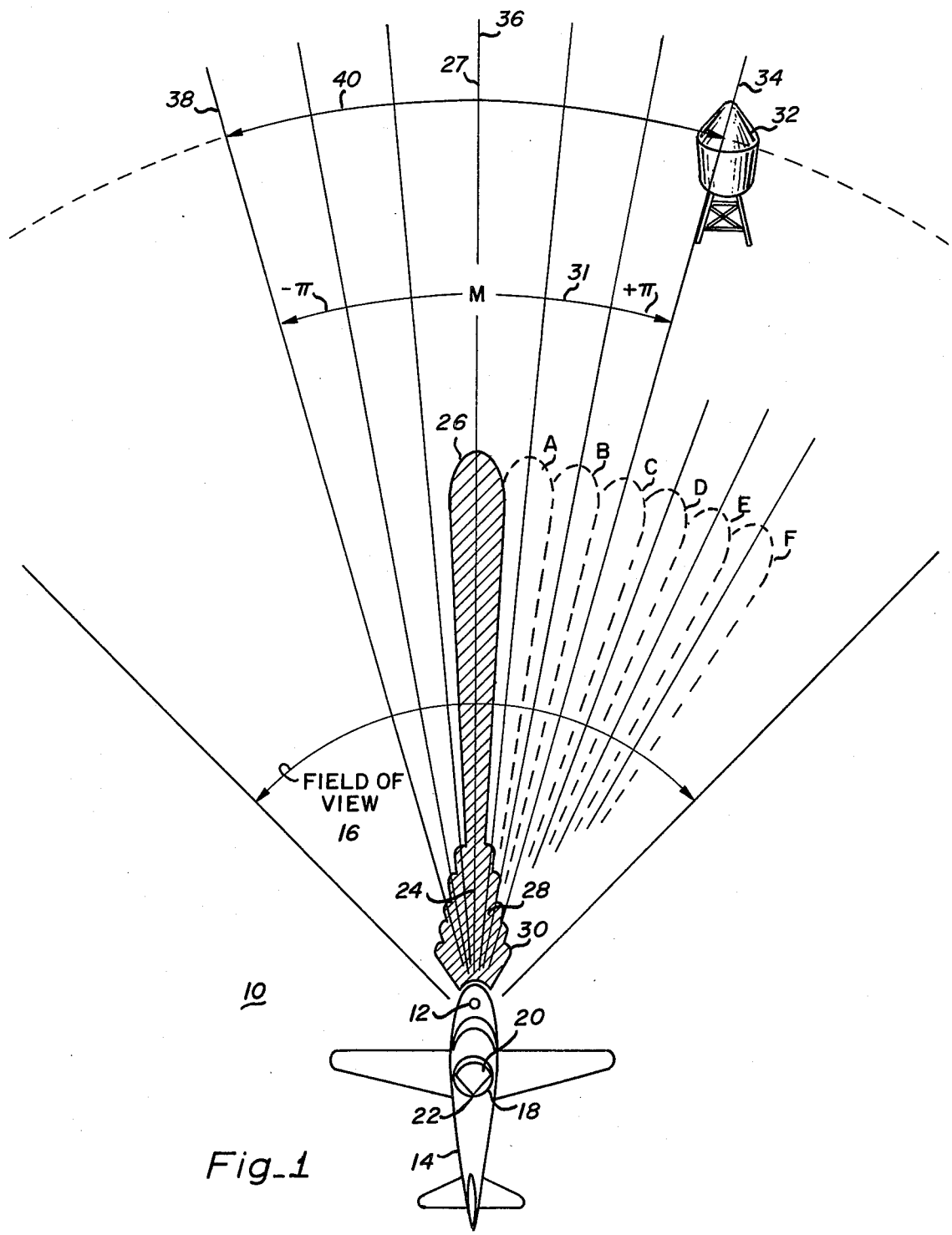
Fig_1

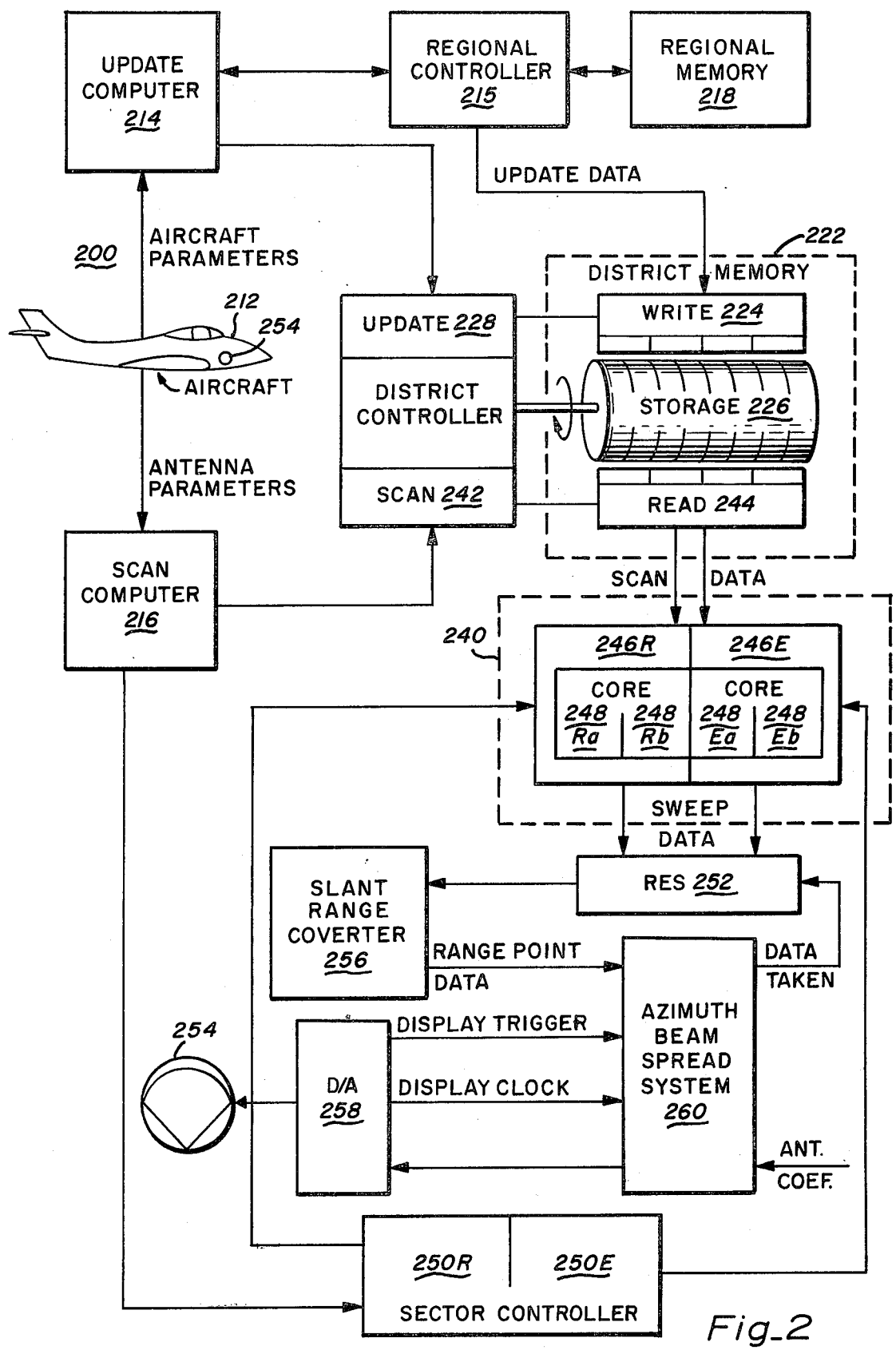
Fig_2

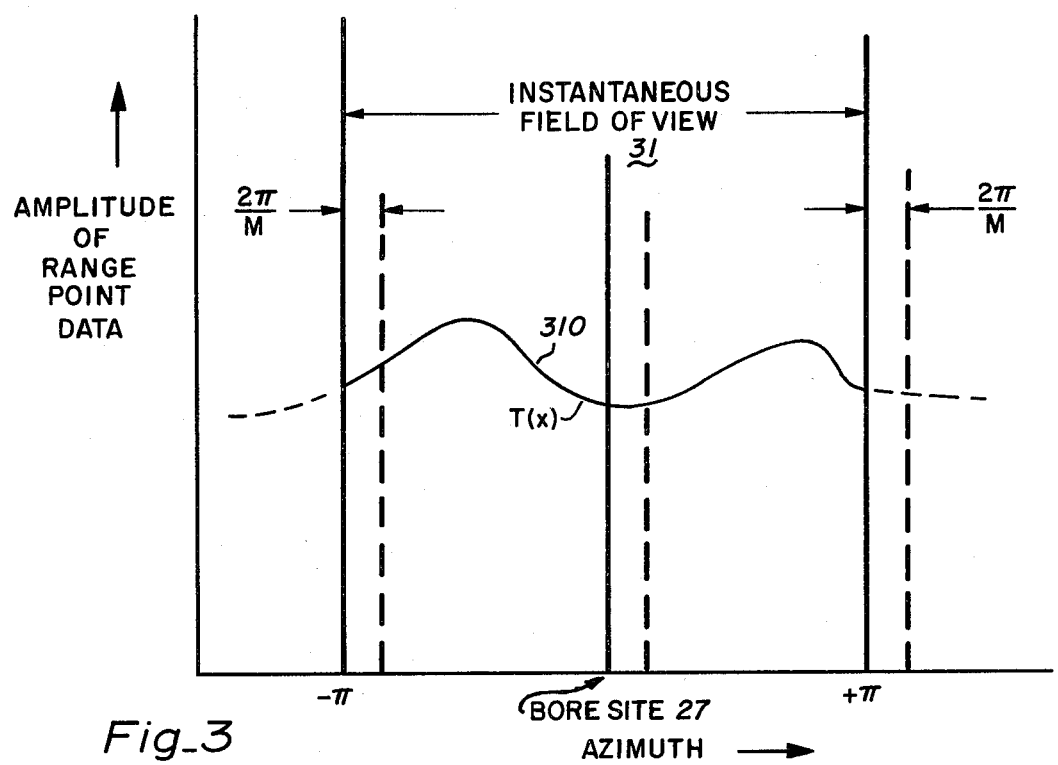
Fig_3
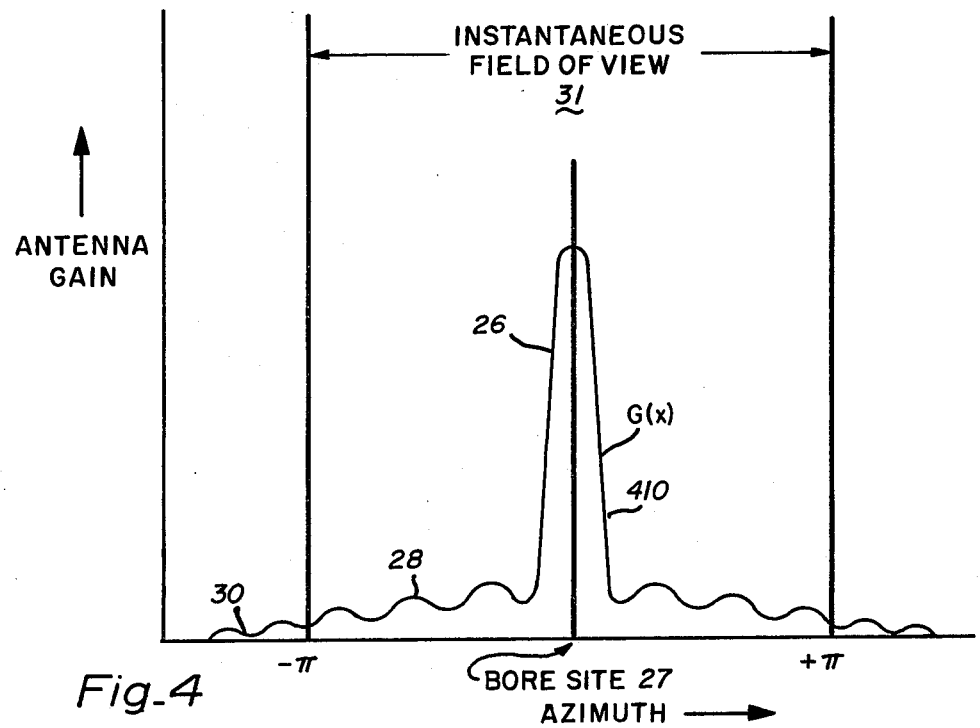
Fig_4

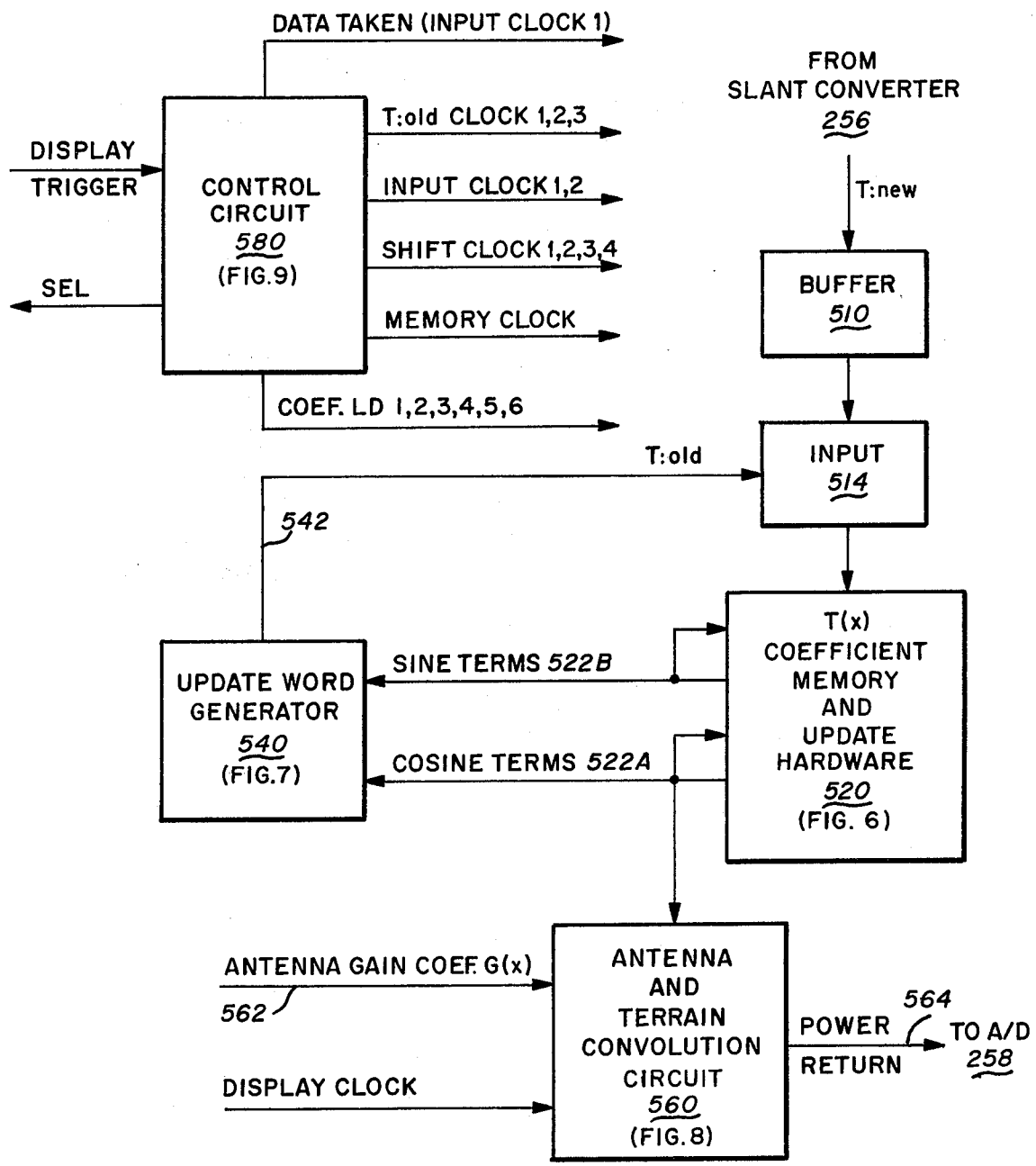
Fig_5

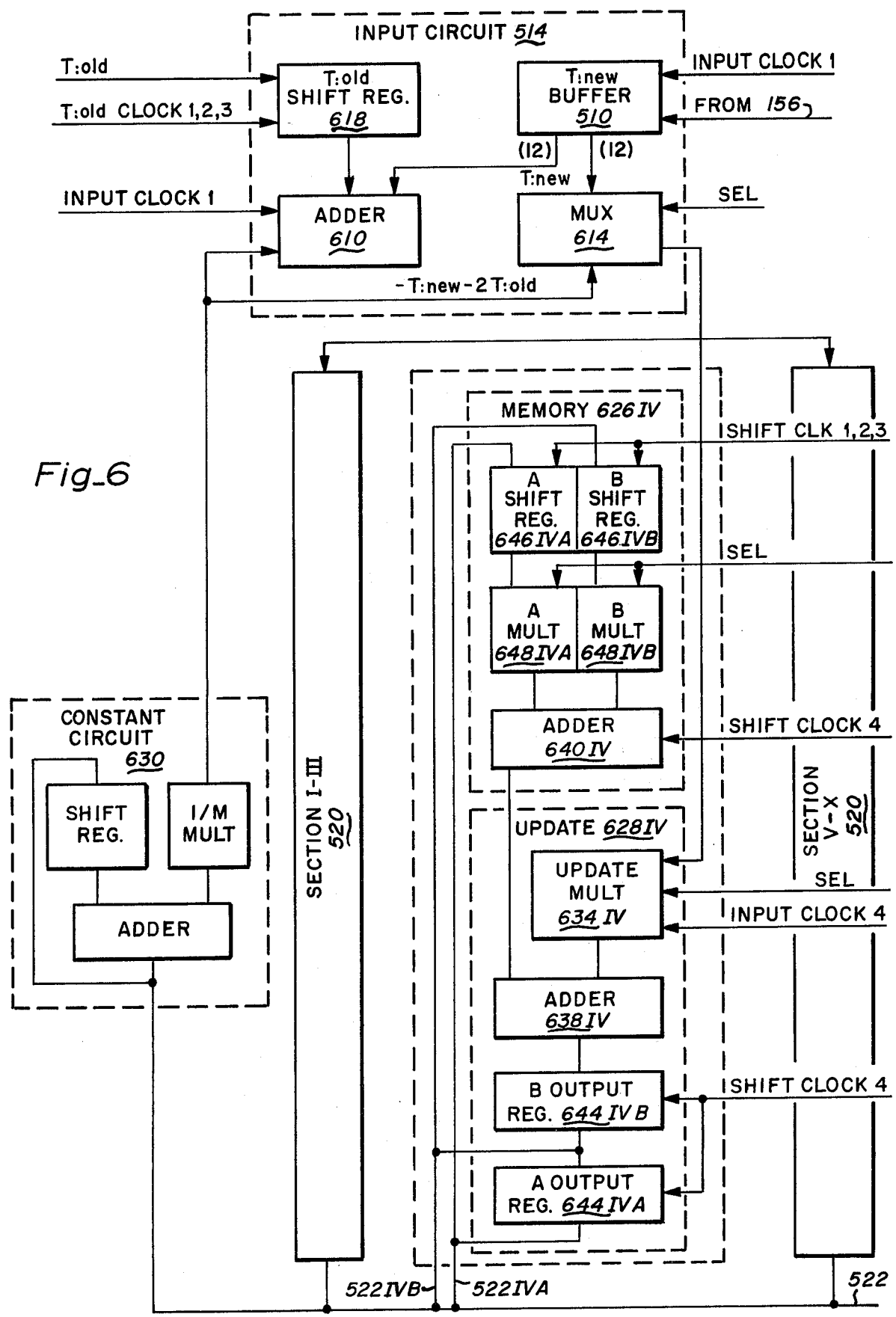
Fig_6

APPARATUS FOR CONVOLUTING COMPLEX FUNCTIONS EXPRESSED AS FOURIER SERIES

TABLE OF CONTENTS

| TITLE | Cols. |
|---|---|
| BACKGROUND OF THE INVENTION | 1 |
| SUMMARY OF THE INVENTION | 2 |
| BRIEF DESCRIPTION OF THE DRAWINGS | 3 |
| GENERAL DESCRIPTION OF THE SIMULATED RADAR LANDMASS SYSTEM | 4 |
| THE THEORY OF OPERATION OF THE AZIMUTH BEAMSPREADER 260 | 5 |
| MATHEMATICS FOR BEAMSPREADER 260 | 6 |
| GENERAL MATHEMATICAL ANALYSIS OF FOURIER METHOD OF BEAMSPREAD SIMULATION | 9 |
| GENERAL DESCRIPTION OF BEAMSPREAD SYSTEM 260 | 10 |
| DETAILED DESCRIPTION OF AZIMUTH BEAMSPREAD SYSTEM 260 OPERATION | 10 |
| DETAILED DESCRIPTION OF THE CIRCUIT ELEMENTS OF AZIMUTH BEAMSPREAD 260 | 13 |
| CLAIMS. | 16-19 |

BACKGROUND OF THE INVENTION

1. Field of the Invention

This invention relates to convoluting two mutually scanned functions by multiplying Fourier series of the functions; and more particularly to multiplying terrain and antenna gain data at each range point for causing azimuth beamspreading in a simulated radar display.

2. Discussion of the Prior Art

FIG. 1 shows an airborne radar system 10 in operation. A receive-transmit antenna 12 mounted on aircraft 14 rotates or scans back and forth across a field-of-vision 16. A typical field of view extends 45° on either side of the line of flight, and a typical scan rate about 40° per second. Antenna 12 transmits directional radar pulses at a pulse rate (PRF) of typically 2000 pulses per second. A display CRT 18 mounted in aircraft 14 displays field-of-view 16 by generating a series of electron beam sweeps 20. Each sweep 20 extends from a display vertex at a distance from vertex 22 corresponding to the range of the object. The intensity of the display spot is a function of the reflectivity and distance of the object times the combined transmit-receive gain of antenna 12. A typical composite transmit-receive antenna gain pattern is shown at 24. Gain pattern 24 has a central main lobe 26 aligned with antenna bore site 27. Gain pattern 12 also has a secondary portion formed by major side lobes 28 of low gain and minor side lobes 30 of even less gain. Minor side lobes 30 provide such a minimal return pulse that they can effectively be ignored in training simulation of the FIG. 1 actual radar system. Main lobe 26 and major side lobes 28 define an instantaneous field-of-view 31 of typically from about one to about ten degrees within overall field-of-view 16. Each terrain object such as water tower 32, generates a display spot in display 18 for each electron beam sweep 20, because each transmit pulse from antenna 12 extends over the same instantaneous field-of-view 31 from which the return pulses are collected. The display spot brightness is negligible for sweeps 20 corresponding in position to minor side lobes 30, low for sweeps 20 corresponding in position to major side lobes 28, and brightest for sweeps 20 positionally corresponding to main lobe 26. As antenna 12 scans to the right, placing main lobe 26 into sequential positions A, B and C (shown in dashed lines), water tank 32 becomes positionally aligned with the high gain main lobe 26 and the water tank display spots become brighter due to the higher gain of antenna 12. At subsequent main lobe positions D, E and F, water tank 32 moves out of alignment with main lobe 26 and into the left-hand portion of major side lobe 28. The display bightness drops at positions D, E and F because of the lower side lobe gain of antenna 12.

Azimuth beamspread of water tank 32 in display 18 of the actual radar system 10 is caused by the thickness of main lobe 26 and by major side lobes 28 which generate a small but visible display spot in each side lobe sweep when antenna 12 is not directed at water tank 32. The water tank display spots have the same range on display 18, but occupy adjacent sweeps. The collective effect of the water tank display spots is a larger spot having a smeared appearance. The collective spot has a bright center portion formed by all of the sweeps within the beamwidth of main lobe 26. In addition, the collective spot has a left-hand and right-hand tail of progressively decreasing intensity caused by the progressively decreasing intensity caused by the progressively decreasing gain of right-hand and left-hand side lobes 28, respectively.

Heretofore, in radar simulation devices the azimuth beamspread effect was reproduced by retrieving data on R range points in each of the M sweeps within main lobe 26 and major side lobes 28. The data was retrieved point by point from a large data grid or map and arranged in an R bit × M bit memory. As antenna 12 scanned across field-of-view 16 a new lead sweep 34 was loaded into one end of the R × M memory and the expired trail sweep 36 was dumped out the other end. The R × M memory was updated for each transmit-return pulse or CRT sweep 20. The data in the R × M memory was pure or ideal terrain data without the azimuth beamspread smear or distortion. The azimuth beamspread smear was introduced by weighting and averaging technique described in U.S. patent application No. 3,919,535 entitled "Multiple Addend Adder and Multiplier" by Evor S. Vattuone, filed Aug. 21, 1974 and assigned to the present assignee. Although this implementation is capable of producing good results, it has certain drawbacks. The hardware design is highly dependent on the parameters of the particular radar simulated, and is further complicated for multimode radars having multiple PRF's and scan rates. In addition, the material cost can rise prohibitively should the radar have a wide beamwidth or a high PRF and low scan rate.

SUMMARY OF THE INVENTION

It is therefore an object of this invention to provide:

convolution of functions represented as Fourier series;

multifunction convolution of Fourier series functions at least one of which is nonperiodic;

updating of a limited interval of a function from a larger interval of the same function to generate new Fourier coefficients for the Fourier series representing the limited interval as the limited interval incrementally advances along the larger interval;

a highly flexible azimuth beamspread simulator which requires less hardware and data processing;

an azimuth beamspreader which can accommodate a wide range of sweeps within the antenna gain bandwidth, wide range of sweep rates, and a wide range of scanning velocities; and an azimuth beamspreader simulator in which the range or the antenna gain pattern can be instantaneously changed.

Briefly these and other objects are accomplished by providing a data storage device for holding the coefficients of a Fourier series for each convoluted function over a limited interval:

$$F(x) = A_{J_o} + \sum_{k=Ma}^{Na} (A_{k_j} \cos kx) + \sum_{k=MB}^{Nb} (B_{k_j} \sin kx)$$

Generally $k = Ma = Mb = 1$.

An input circuit is provided for receiving new incremental data F:new as the convolution of the limited interval increments along a larger interval of that function. A computer device is provided for calculating an F:old update entity for each increment:

$$F{:}old = \sum_{k=Ma:old}^{Na:old} (-1)^k A_{k_j} + \pi/M \sum_{k=Mb:old}^{Nb:old} (-1)^k kB_{k_j}$$

The number of terms in the A and B portion of the F:old summation need not necessarily be the same, and may be greater than, equal to or less than the corresponding terms in the $F(x)$ Fourier series. A B update device provides a $$B \text{ update term} = \frac{(-1)^n (-F{:}new)(1 - \cos 2\pi n/M)}{n\pi}$$

for each increment, and adds the B update term to the B coefficients of the $F(x)$ Fourier series. An A update device provides a $$A \text{ update term} = \frac{(-1)^n (F{:}new - 2 F{:}old)(\sin 2\pi n/M)}{n\pi}$$

for each increment and adds the A update term to the A coefficients of the $F(x)$ Fourier series. A convolution devices provides $$\int F1(x) F2(x) \ldots Fh(x) \, dx$$

over the limited interval.

BRIEF DESCRIPTION OF THE DRAWINGS

Further objects and advantages of the present azimuth beamspreader and the updating process will become apparent from the following detailed description taken in conjunction with the drawing, in which:

FIG. 1 is plan view of an airborne radar system scanning a water tower 32;

FIG. 2 is a block diagram of airborne radar simulator showing the azimuth beamspread subsystem 260;

FIG. 3 shows a typical terrain profile versus azimuth at a given range $T(x)$ along a given range arc;

FIG. 4 shows a typical antenna gain pattern $G(x)$ versus azimuth showing the large main lobe 26 and decreasing side lobes 28 and 30;

FIG. 5 is a block diagram of the azimuth beamspread subsystem 260 showing data flow between the memory, update, and convolution portions;

FIG. 6 is a detailed logic diagram of coefficient memory and update hardware 520 of FIG. 5;

GENERAL DESCRIPTION OF THE SIMULATED RADAR LANDMASS SYSTEM

Figure 7:
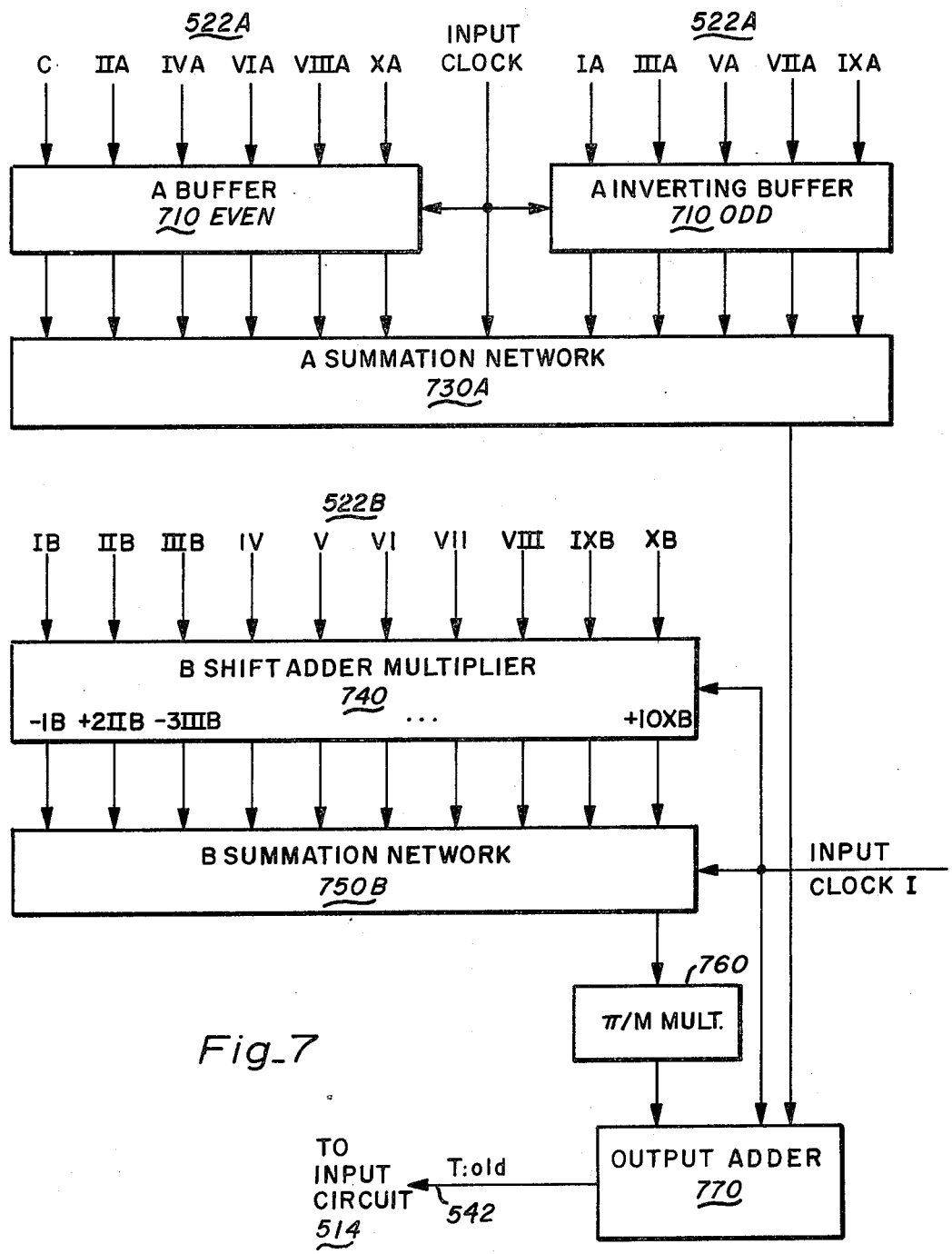
FIG. 7 is a detailed logic diagram of update word generator 540 of FIG. 5.

FIG. 2 shows a block diagram of the digital radar landmass system (DRLMS) 200. An aircraft training device 212 in simulated flight forwards flight motion data or "aircraft parameters" to a scan generation computer 216. Update computer 214 has a regional controller 215 which transfers currently required data from a large regional memory 218 to update a smaller district memory 222. Regional memory 218 is a suitable high-volume memory device such as a moving head disc for retaining the radar detectable features of the entire gaming area. Regional controller 215 is the hardware interface between regional memory 218 and update computer 214. Controller 215 receives regional disc addresses from update computer 214, obtains the specified regional data and forwards the data in data blocks into district memory 222. A write head 224 transfers the update data into a rotating data storage device 226 at the address specified by an update district controller 228. Update controller 228 receives district addresses (band and sector) from update computer 214 and orientation information from rotating member 226 and correlates the district update data with the district address commands from update computer 214. Thus, as aircraft 212 moves through the gaming area in simulated flight, update computer 214 constantly provides district memory 222 with position update data.

More specific portions of the update data in district memory 222 are further transferred in miniblocks to a sector memory 240 in response to the antenna parameters from aircraft 212 to scan computer 216. Scan computer 216 provides district address (band and sector) to a scan district controller 242, which reads orientation information from rotating member 226. Scan district controller 242 correlates the district address commands from scan computer 216 with the rotation of device 226, and causes a read head 244 to transfer the more particular updata data, or scan data, into sector memory 240. Sector memory 240 has a reflectance section 246R which receives scan reflectance data and an elevational section 246E which receives scan elevational data. The scan data is alternately entered first into sector core memories 248R$a$ and 248E$a$, and second into sector core memories 248R$b$ and 248E$b$ in response to a sector controller 250R and 250E. Sector controller 250 correlates the antenna scan data with each antenna sweep and forwards the data from selected core addresses (sweep data) into a radar equation subsystem 252. RES 252 calculates the brightness of each range point on each sweep of the simulated radar display on a radar screen 254; a slant range converter 256 introduces the aircraft elevation into brightness computation; and azimuth beamspreader 260 smears the range point data to simulate the effect of M sweeps in bandwidth 22. Screen 254 is located on aircraft 212 and interfaces with RES 252 through a digital to analog converter 258. DRLMS 200 is described in more detail in patent applications:

Ser. No. 499,263 entitled "Simulated Digital Radar System" by Jack W. Newhard, Jack W. Demarest, Frederick F. Mulholland, Jr. and Jim Nakasuji, now abandoned;

Ser. No. 499,301 entitled "Simulated Digital Radar System with Elevation Interpolation" by Jack W. Newhard and Frederick F. Mulholland, Jr., now abandoned; and Ser. No. 499,261 entitled "Simulated Digital Radar System with Data Block Mapping Technique" by Stephen T. Mori now abandoned.

The above three applications were filed on 21 August 1974 and assigned to the present assignee.

THE THEORY OF OPERATION OF THE AZIMUTH BEAMSPREADER 260

The azimuth beamspread effect is a distortion of the object caused by side lobes 28 and the beamwidth of main lobe 26. During the time period required for the antenna to scan across the angle of its instantaneous field of vision 31, the radar transmits M pulses and generates M sweeps on display 18. Therefore, a single target object within the instantaneous field angle is registered M times on radar display 18. Training system 200 simulates these M returns generated in real system 10 by retrieving M returns at each one of R range points. The M returns at each range are distributed across a range arc extending across instantaneous field 31 at a radius equal to the range and a center at aircarft 212. The retrieved return signal intensity is low for the first sweeps of screen 254 when the object is just within leading sweep 34 of effective field 31. The retrieved return signal increases for subsequent sweeps and peaks at center sweep 36 along azimuth boresite 27. The return signals decrease thereafter and return to the original low value for trailing sweep 38 along the other edge of instantaneous field 31. These M return signals of varying amplitude cause a smeared image on radar screen 254. This smear or beamspread effect is a function of azimuth, and is independent of range. The M returns of water tower 32 along range arc 40 may be plotted against azimuth forming a water tower profile. A family of R terrain profiles or functions, one for each range arc, are retained in beamspread system 260. Terrain function $T(x)$ for a typical range arc is shown in FIG. 3.

Terrain function $T(x)$ can be mathematically represented by Fourier coefficients. The region of interest, $-\pi$ to $+\pi$, covers the M sweeps within instantaneous field 31 and is considered to be one period. In this manner each of the nonperiodic, arbitrary terrain profiles can be represented as an infinite series of sines and cosines. Each screen sweep advances across function $T(x)$ a scanning increment equal to $2\pi/M$. Terrain function $T(x)$ for each range arc requires a unique Fourier series. The infinite series is, of course, truncated; and once the number of terms $N_t$ to be used is determined, their coefficients are stored in the beamspread memory (626 in FIG. 6). The $N_t$ terms representing the terrain data along each range arc must be continuously scan-updated by sweep data from sector memory 240 as the antenna scan progresses. The sweep data is constantly motion-updated by regional controller 215 and district memory 222 as aircraft motion is simulated.

The number of coefficients $N_c$ required for $N_t$ Fourier terms is:

$N_c$ = one constant term + $N_t$ sine terms + $N_t$ cosine terms
$N_c = 2N_t + 1$ The capacity of the beamspread memory (626) must be sufficient to hold $N_c$ coefficients for each one of R range arcs, or:

Beamspread Memory Capacity = $R \times N_c = R(2N_t + 1)$

FIG. 4 shows a typical antenna gain pattern $G(x)$ which is also represented as a set of Fourier coefficients. The Fourier series provides a smooth curve representation of the antenna response as opposed to the step weighted approximation of the prior art. Antenna function $G(x)$ is fixed for each antenna mode of operation, and does not require scan updating or motion updating. The beamspread smear is developed from a point-by-point convolution (weighting and summation) of terrain function $T(x)$ with antenna function $G(x)$ as the antenna scans. The resulting points connect on a smooth curve. The individual weights and sums of each range point fall under the integral of the two continuous functions $G(x)$ and $T(x)$ multiplied together. (See "Methods of Signal and System Analysis", Chapter 4, by Cooper and McGillem; Holt, Rinehart and Winston, Inc. 1967.)

The gain function $G(x)$ and the radar return terrain function $T(x)$ are orthogonal and orthonormal functions represented as Fourier series. The convolution integral degenerates to a multiplication of coefficients of like terms in the series (sine times sine and cosine times cosine) and a summation of all the products. The coefficients for antenna function $G(x)$ are constant and preferably supplied to beamspread system 260 by scan computer 216. The coefficients for terrain function $T(x)$ are generated separately for each range arc of each scan by beamspread system 260 by a scan-updating technique described in detail in Section VII.

MATHEMATICS FOR BEAMSPREADER 260

Beamspreader 260 obtains beamspread response by arranging the terrain data from regional memory 218 into terrain profiles 310 for each range arc. Profiles 310 are multiplied by gain function $G(x)$ which is defined over the beamwidth, and then added to obtain the beamspread response. This process of multiplying and adding is discussed below.

General Description

M sweeps worth of range point data are transformed into a profile for each range arc. Each of these R profiles are defined by a set of Fourier coefficients which occupy considerably less storage than M sweeps worth of range point data. The gain function over the beamwidth is also defined in terms of Fourier coefficients, and the resulting beamspreading response is computed by multiplying like coefficients of the gain series and terrain series and then summing the products. As new sweep data enters the system, the Fourier coefficients of each range arc are updated causing the profile to make an apparent $2\pi/M$ shift to the right (see FIG. 3).

Theoretical Basis

To use Fourier coefficients to describe terrain function $T(x)$ and gain function $G(x)$, the following assumptions are made:

1. It is assumed that instantaneous field 31 has M sweeps and is defined over $2\pi$ radians ($-\pi \leq X \leq \pi$) and that each sweep represents a delta X of $2\pi/M$.

2. It is assumed that both terrain function T(x) and gain function G(x) can be described by Fourier coefficients and therefore are periodic in x, and have one period over instantaneous field 31 ($2\pi$ or M sweeps). Thus, both functions 310 and 410 will be defined for all x.

3. It is assumed that terrain profile T(x) has a value of an approximation of the average of T($\pi$) and T($\pi+2\pi/M$) between $\pi \leq X \leq \pi + 2\pi/M$. Actually, T(x) has an infinite number of values between $\pi$ and $\pi + 2\pi/M$.

T(x) is caused to make an apparent shift when the Fourier coefficients of the profile are updated by means of a set of recursion formulae which relate the present sweep time's (j + 1st) coefficients to the previous sweep time's (jth) coefficients and the new data entering the system.

The problem is to obtain the Fourier coefficients for the apparently shifted profile in FIG. 3 based on terrain function T(x) of the previous sweeps plus the new sweep data. First assume that there is no new data, in which case the Fourier coefficients of the profile for sweep time j will be given by equations 1, 2, and 3:

$$A_{n_j} = \frac{1}{\pi} \int_{-\pi}^{\pi} T(x) \cos nx\, dx \qquad 1.$$

$$B_{n_j} = \frac{1}{\pi} \int_{-\pi}^{\pi} T(x) \sin nx\, dx \qquad 2.$$

$$A_{o_j} = \frac{1}{2\pi} \int_{-\pi}^{\pi} T(x)\, dn \qquad 3.$$

For the next sweep time, the coefficients are developed by assuming an apparent shift in the profile which is mathematically implemented by shifting the limits of integration on equations 1 through 3 to the right and by shifting x in the cosine and sine terms. The coefficients of the profile for the j+1st sweep are given by equations 4, 5, and 6:

$$A_{n_{j+1}} = \frac{1}{\pi} \int_{-\pi+2\pi/M}^{\pi+2\pi/M} T(x) \cos n\left(x - \frac{2\pi}{M}\right) dx \qquad 4.$$

$$B_{n_{j+1}} = \frac{1}{\pi} \int_{-\pi+2\pi/M}^{\pi+2\pi/M} T(x) \sin n\left(x - \frac{2\pi}{M}\right) dx \qquad 5.$$

$$A_{o_{j+1}} = \frac{1}{2\pi} \int_{-\pi+2\pi/M}^{\pi+2\pi/M} T(x)\, dx \qquad 6.$$

Terrain function T(x) remains the same and the limits of integration (the sine and cosine terms) are shifted to the right by $2\pi/M$. The j+1 subscript refers to the j+1st sweep, whereas T(x) refers to the profile for the jth sweep. The profile function T(x) is given by the truncated Fourier series of equation 7:

$$T(x) = A_{o_j} + \sum_{k=1}^{Nt} A_{k_j} \cos kx + B_{k_j} \sin kx \qquad 7.$$

$$= \text{(constant term)} + \text{(summation term)}$$

The coefficients for T(x) are those which describe the profile for sweep j. T(x) is substituted into equations 4, 5, and 6 to obtain a set of recursion relationships for determining the next sweep's Fourier coefficients, assuming that no new data is entering the system.

If new data is entering the system for every sweep, its effect on the profile is included in the recursion relationships by subtracting out that part of the j+1st set of coefficients due to the profile function between $\pi$ and $\pi + 2\pi/M$, and adding in the new data's contribution to the j+1st set of coefficients between $\pi$ and $\pi + 2\pi/M$. Including new sweep data in this manner requires the assumption that the value of the function T(x) between $\pi$ and $\pi + 2\pi/M$ is equal to the average of T($\pi$)j and T($\pi + 2\pi/M$) j = T:old($\pi$). Also, it is assumed that the new data T:new is used between $\pi$ and $\pi + 2\pi/M$. The recursion formulae, after one field 31 of M sweeps, causes the profile to repeat itself. To compensate for this in the recursion formulae, that part of the coefficients due to the function between $-\pi$ and $-\pi + 2\pi/M$ is subtracted out. The value of the function between $-\pi$ and $-\pi + 2\pi/M$ is assumed to be T:old ($-\pi$)j, which is equal to T:old ($\pi$)j, due to the periodicity of T(x). The recursion formulae are given by equations 8, 9 and 10 shere shift = $2\pi/M$:

$$A_{n_{j+1}} = \frac{1}{\pi} \int_{\pi+\text{shift}}^{\pi+\text{shift}} T(x) \cos n(x - \text{shift}) dx \qquad 8.$$
$$- \frac{1}{\pi} \int_{\pi}^{\pi+\text{shift}} T:\text{old}(\pi) \cos n(x - \text{shift}) dx$$
$$- \frac{1}{\pi} \int_{-\pi}^{-\pi+\text{shift}} T:\text{old}(\pi) \cos nx\, dx$$
$$+ \frac{1}{\pi} \int_{\pi}^{\pi+\text{shift}} T:\text{new} \cos n(x - \text{shift}) dx$$

$$B_{n_{j+1}} = \frac{1}{\pi} \int_{-\pi}^{\pi+\text{shift}} T(x) \sin n(x - \text{shift})\, dx \qquad 9.$$
$$- \frac{1}{\pi} \int_{\pi}^{\pi+\text{shift}} T:\text{old}(\pi)j \sin n(x - \text{shift})\, dx$$
$$- \frac{1}{\pi} \int_{-\pi}^{-\pi+\text{shift}} T:\text{old}(\pi)j \sin nx\, dx$$
$$+ \frac{1}{\pi} \int_{\pi}^{\pi+\text{shift}} T:\text{new} \sin n(x - \text{shift})\, dx$$

$$A_{o_{j+1}} = \frac{1}{2\pi} \int_{-\pi+\text{shift}}^{\pi+\text{shift}} T(x)\, dx - \frac{1}{2\pi} \int_{\pi}^{\pi+\text{shift}} T:\text{old}(\pi)j\, dx \qquad 10.$$
$$- \frac{1}{2\pi} \int_{-\pi}^{-\pi+\text{shift}} T:\text{old}(\pi)j\, dx + \frac{1}{2\pi} \int_{\pi}^{\pi+\text{shift}} T:\text{new}\, dx$$

The first integrals account for the shifting of the profile (accomplished by shifting the limits of integration). The second, third and fourth integrals account for the updating of the profile due to T:new.

T(x) as given in equation 7 is substituted into equations 8, 9 and 10; the recursion equations 11, 12, 13 and 14 where $kn = (-1)^n/n\pi$.

$$A_{n_{j+1}} = A_{n_j} \cos (\text{shift } n) + B_{n_j} \sin (\text{shift } n) + k_n$$
$$[T:\text{new} - 2T:\text{old}(\pi)] \sin (\text{shift } n) = A \text{ cosine term}$$
$$+ B \text{ sine term} + \text{update sine term} \qquad 11.$$
$$B_{n_{j+1}} = -A_{n_j} \sin (\text{shift } n) + B_{n_j} \cos (\text{shift } n) + kn$$
$$(-T:\text{new}) [1 - \cos (\text{shift } n)] = A \text{ sine term} + B$$
$$\text{cosine term} + \text{update cosine term} \qquad 12.$$
$$A_{o_{j+1}} = A_{o_j} + 1/M\, [T:\text{new} - 2T:\text{old}(\pi)j] \qquad 13.$$

$$T:\text{old}(\pi)j = A_{o_j} + \sum_{k=j1}^{Nt} (-1)^k A_{k_j} + \frac{\pi}{M} \sum_{k=1}^{Nt} kB_{k_j} (-1)^k \qquad 14.$$

Here, M is equal to the number of sweeps; Nt is the number of terms used; n refers to the $n^{th}$ coefficient; and T:new is the newest data entering the system. Therefore, the profile Fourier coefficients may be updated by using the Fourier coefficients from the previous sweep time and the newest data entering the system, T:new. Thus, the beamspread response can be obtained for every range point and for every sweep time from equations 11, 12, and 13.

The beamspread response for sweep time $j+1$ and range $r$ is obtained by assuming that the gain function $G(x)$ is also periodic, with the period of one beamwidth, and is expressed in terms of a truncated Fourier series as given by equation 15.

$$G(x) = A_{o_g} + \sum_{i=1}^{Nt} A_{i_g} \cos ix + B_{i_g} \sin ix \qquad 15.$$

It can be shown mathematically (see Section VIII) that the beamspread response can be given by equation 16.

$$P_{BS_F} = \frac{1}{2\pi} \int_{-\pi}^{\pi} G(x) T(x) dx \qquad 16.$$

Since $G(x)$ and $T(x)$ are both Fourier series in orthogonal and orthonormal relationship, the integral of equation 16 reduces to equation 17:

$$P_{BS_F} = A_{o_g} A_{o_{j+1}} + \frac{1}{2} \sum_{n=1}^{Nt} (A_{n_g} A_{n_{j+1}} + B_{n_g} B_{n_{j+1}}) \qquad 17.$$

Therefore, the beamspread response can be obtained by implementation of equations 11, 12, 13, 14 and 17. This will obviate the need for storing every sweep's worth of data; however, the complexity of the processing has increased. For this implementation, only $R(2Nt+1)$ Fourier coefficients have to be stored, rather than M sweeps. Also, from equation 17 it can be seen that only $2Nt+1$ multiplications and $Nt+1$ additions have to be implemented instead of M multiplications and M additions.

GENERAL MATHEMATICAL ANALYSIS OF FOURIER METHOD OF BEAMSPREAD SIMULATION

The beamspread response for M sweeps is given by:

$$T_{BS} = \sum_{j=1}^{M} T(x_j) G(x_j)$$

where $T(x)$ is the profile function over M sweeps and $G(x)$ is the gain function over M sweeps.

But by definition of the integral, the limit of the sum is the definite integral:

$$\lim_{\Delta x \to 0} \sum_{j=1}^{M} T(x_j) G(x_j) \Delta x = \int_{x_1}^{x_M} T(x) G(x) dx$$

Therefore, if the incremental value delta $x$ is allowed to approach zero, but not reach zero, then the integral is only an approximation of the sum, thus:

$$\sum_{j=1}^{M} T(x_j) G(x_j) x = \int_{x_1}^{x_M} T(x) G(x) dx$$

or:

$$\sum_{j=1}^{M} T(x_j) G(x_j) = \frac{1}{\Delta x} \int_{x_1}^{x_M} T(x) G(x) dx$$

The profile function is defined by the Fourier series:

$$T(x) = A_o + \sum_{n=1}^{\infty} A_n \cos nx + B_n \sin nx$$

The gain function $G(x)$ is also defined by a Fourier series, $$G(x) = A_{o_g} + \sum_{k=1}^{\infty} A_{k_g} \cos kx + B_{k_g} \sin kx$$

The value of $x_1$ is $-\pi$ and the value of $x_M$ is $+\pi$: $x_1 = -\pi$, $x_M = +\pi$. $\Delta x = 2\pi/M$ where M is the number of sweeps.

If these series are substituted into the above integral equation and the integral is evaluated between $-\pi$ and $+\pi$, then the result is as follows:

$$T_{BS} = \frac{1}{2\pi} \int_{-\pi}^{\pi} T(x) G(x) dx$$

$$T_{BS} = A_o A_{o_g} + \frac{1}{2} \sum_{n+1}^{\infty} (A_n A_{n_g} + B_n B_{n_g})$$

$B_n/A_n \longrightarrow$ profile Fourier coefficients.

$B_{n_g}/A_{n_g} \longrightarrow$ gain Fourier coefficients.

GENERAL DESCRIPTION OF BEAMSPREAD SYSTEM 260

FIG. 5 is a block diagram of beamspread system 260 showing the data flow therethrough and timing information. The timing relationships are further described in FIG. 9. DATA TAKEN signals from control circuit 580 causes slant range converter 256 to advance individual range point data into coefficient memory and update hardware 520. Hardware 520 holds the current A and B Fourier coefficients of equation 7 in memory, and provides logic circuitry for updating the coefficients with the T:new input. Hardware 520 also generates equations 11, 12 and 13 for each term of the Fourier series. Update word generator 540 manipulates and sums the terms of equations 11, 12 and 13 received on lead 522 to provide T:old which is fed back to hardware 520 for updating. Antenna and terrain convolution 560 multiples $T(x)$ from output 522A times $G(x)$ provided by scan computer 216.

DETAILED DESCRIPTION OF AZIMUTH BEAMSPREAD SYSTEM 260 OPERATION

FIG. 6 shows a block diagram of input circuit 514 and coefficient memory and update hardware 520. Each T:new is loaded into T:new buffer register 510 in response to DATA TAKEN from control circuit 580. INPUT CLOCK advances each range point through input 514 to adder 610 and MUX 614. T:old supplied by update word generator 540 is advanced through T:old shift register 618 by SHIFT CLOCK 1. Shift register 618 has R locations which hold each range point data for one sweep cycle. Each T:old appears at adder 610 simultaneously with its corresponding range point in the next cycle, T:new. T:old is doubled by a hardwired left shift into adder 610. The — (T:new - 2 T:old) output of adder 610 and T:new are in the update terms of equation 11 and equation 12. They are multiplexed through MUX 614 in response to SELECT form control circuit 580 and appear at memory and update hardware 520 formed by memory array 626 I-X and update circuits 628 I-X. Hardware 520 has 10 sections I-X, each R places long, for providing the first ten summation terms of the truncated Fourier Series (equation 7) approximating the terrain profile at all of the R range arcs. The constant term of equation 7 is provided by constant coefficient circuit 630. Each section I-X provides both the A cosine term and the B sine term on a multiplexed basis. The resulting 21 terms (one constant + 10 A cosine + 10 B sine) of equation 7 provide sufficient resolution for azimuth beamspread radar applications. However, more or fewer Fourier terms may be employed according to the resolution desired. Only Section 520 IV is shown in detail in FIG. 6 and described below. The remaining sections are identical in construction and operation.

Input circuit 514 provides update elements T:new and — (T:new - 2 T:old) alternatively to update multiplier 634 IV in update circuit 628 IV. Multiplier 634 IV multiplies the update term by either $K_n \sin X_n$ or $K_n (1 - \cos X_n)$ in response to SELECT to provide the update sine term of equation 11 and the update cosine term of equation 12 alternatively. These update terms are combined with the remaining terms of equation 11 and equation 12 through adder 638 IV to provide at output 522 IV the IV A and IV B terms alternatively of the equation 7 Fourier series. The terms I-X plus the constant term are forwarded to antenna and terrain convolutions circuit 560. Terms I-X also update memory circuits 626 from output registers 644 IVA and 644 IVB to generate the A and B coefficients of the next sweep. That is, term IVA from A output register 644 IVA updates A shift register 646 IVA in response to SHIFT CLOCK 2. Term IVB from B output 644 IVB simultaneously updates B shift register 646 IVB. The IVA and IVB terms advance through the R positions of shift registers 646 in response to SHIFT CLOCK 1, and load into A multiplier 648 IVA and B multiplier 648 IVB as the corresponding range point of the next sweep is being processed by input 514. A multiplier 648 IVA multiplies by either cos (shift $n$) or sin (shift $n$) depending on the status of SELECT to provide the A cosine term of equation 11 or the B sine term of equation 12. B multiplier 648 IVB similarly multiplies by either cos (shift $n$) or sin (shift $n$) to provide the B sine term of equation 11 and the B cosine term of equation 12. The appropriate terms are combined by adder 640 IV to provide the sine and cosine terms of equation 11 and equation 12 for the corresponding range arc in the next sweep. The complete equation 11 and 12 of the next arc is formed by adder 638 IV where the update terms are added to the output of adder 640 IV. The constant term of equation 7 Fourier series is updated by circuit 630 which operates in theory the same as any section I-X of array 520, but is much simplified in hardware due to the lack of sine and cosine considerations. The output of circuit 630 provides the updated constant term as expressed in equation 13.

FIG. 7 shows A buffer register 710 EVEN for receiving the constant term plus the five EVEN A terms (IIA, IVA, VIA, VIII, X) from output 522 in response to INPUT CLOCK 1. A inverting buffer 710 ODD receives and inverts the five odd A terms (IA, IIIA, VA, VIIA, IXA). The 11 outputs of registers 710 are combined by A summation network 730A. The ten B terms from output 522 are loaded into B shift adder multiplier 740 in response to INPUT CLOCK 1. Each B term is multiplied by a constant equal to the number of the term, as shown in the table below. The five odd B terms (IB, IIIB, VB, VIIB, IXB) are inverted. The multipliers of multiplier 740 are formed by hard-wired place shifting the inputs to multiplier 740 forming integer multiplier combinations which combine to yield the desired multiplier (see table).

TABLE I

| Fourier Series B Term | Integer Combination Formed by Place Shifting | Desired Multiplier for Multiplier 740 |
|---|---|---|
| I B | −1 | −1 |
| II B | +2 | +2 |
| III B | −4 and +1 | −3 |
| IV B | +4 | +4 |
| V B | −4 and −1 | −5 |
| VI B | +4 and +2 | +6 |
| VII B | −8 and +1 | −7 |
| VIII B | +8 | +8 |
| IX B | −8 and −1 | −9 |
| X B | +8 and +2 | +10 |

The odd term inverting in buffer register 710 odd and multiplier 740 is due to the (−1) to the $n$th term in equation 11 and 12 from which the ten A terms and ten B terms were generated. The 10 B outputs of multiplier 740 are combined in B summation network 750B. The A and B summations are then combined in output adder 760 to form T:old at output 542.

Figure 8:
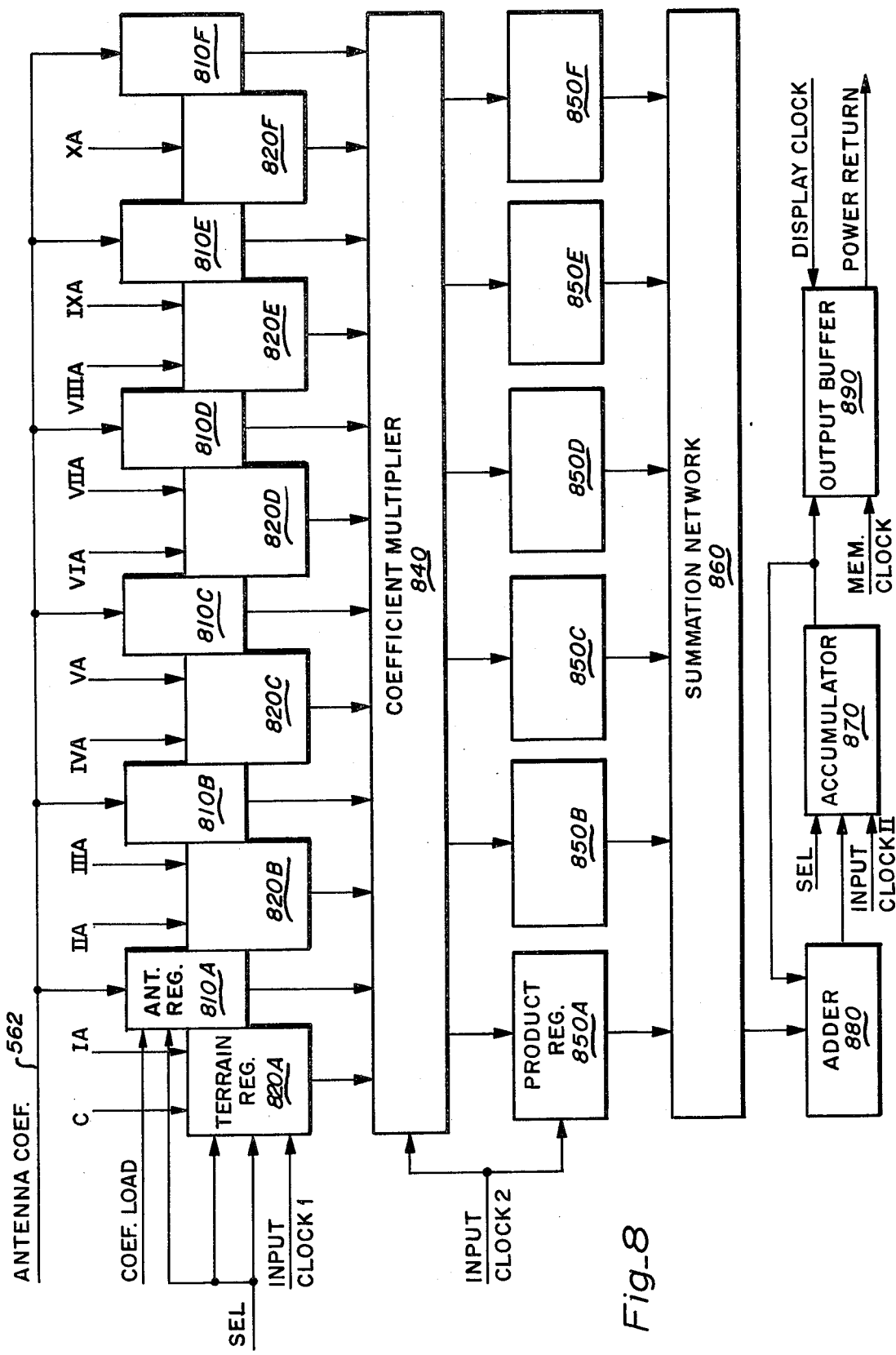
FIG. 8 is a detailed logic diagram of antenna and terrain convolution 560 of FIG. 5.

FIG. 8 shows antenna and terrain convolution circuit 560 which multiplies each A term (one constant plus ten cosine terms) by a corresponding antenna gain coefficient from scan computer 116. The eleven antenna gain coefficients load one at a time into register 810 in response to COEFFICIENT LOAD. These coefficients are fixed for each gain pattern of a given aircraft, and change only when changing antenna modes. The eleven corresponding terrain data coefficients C (IA, IIA, IIIA—XA) simultaneously load into tristate buffer registers 820A-F each sweep in response to INPUT CLOCK 1. The coefficients are multiplexed into a first and second group for processing through the remainder of circuit 560. The first group loads from registers 810 and 830 into coefficient multiplier 840 in response to OUTPUT SELECT, forming a first group of products in product buffer registers 850 A-E. INPUT CLOCK 2 immediately advances the first product group into summation network 860. The second group of antenna and terrain coefficients from registers 810 and 820 A-E are loaded into multiplier 840 forming a second product group in buffer register 850. The two product groups advance through summation network 860 in response to INPUT CLOCK 2 forming a first sum in accumulator 870 and a second sum in adder 880. On the next clock, the first sum is returned to adder 880 forming the power return which advances to output buffer 890. The power return loads into A/D 158 in response to DISPLAY CLOCK.

Figure 9:
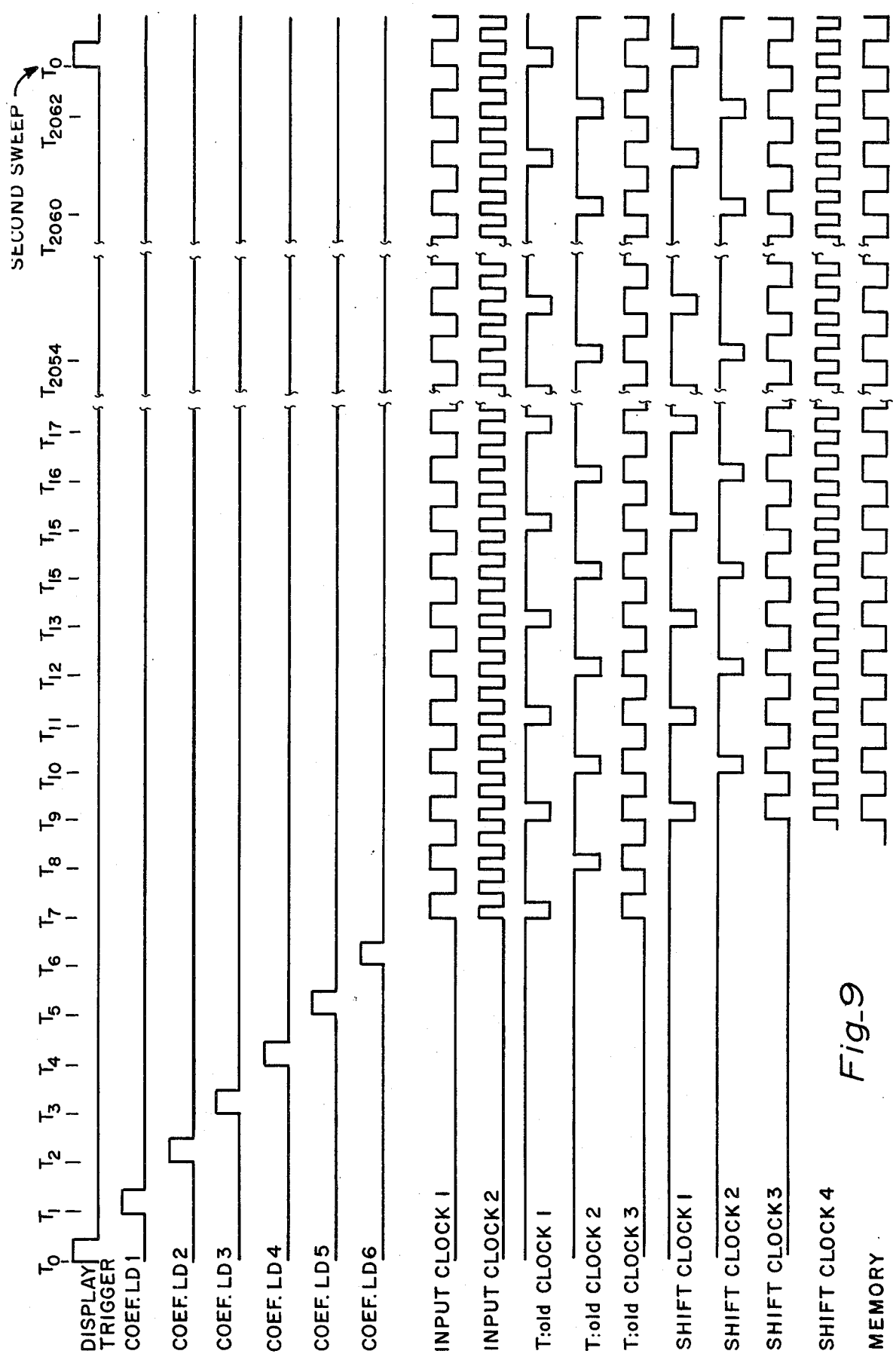
FIG. 9 is a waveform-timing diagram for control circuit 580 of FIG. 5.

FIG. 9 shows a timing diagram illustrating the timing relationship of the control signals from control circuit 580. The control signals are periodic and are shown for a single sweep cycle starting at $t = o$ (simulated pulse transmission from aircraft 200) to $t = 2062$. The sweep cycle is initiated by DISPLAY TRIGGER from display circuitry D/A 258 at $t = o$. Immediately thereafter, control circuit 580 generates six COEFFICIENT LOAD pulses for loading the eleven antenna gain coefficients of the particular operating mode. These gain coefficients remain the same for each sweep, and change only when the antenna mode is changed. However, they are loaded anew each sweep in order to provide immediate mode change capability. At $t = 7$, INPUT CLOCK 1 begins loading T:new and T:old into input circuit 514. INPUT CLOCK 2 is twice the frequency of INPUT CLOCK 1 and loads the multiplexed output of MUX 614 into update multipliers 634 I-X. T:old CLOCK 1 and T:old CLOCK 2 form a two-phase clock for loading double-shift register 618. T:old CLOCK 3 is twice the frequency of T:old CLOCKS 1 and 2 and is the fundamental operation rate of shift register 618. At $t = 9$, SHIFT CLOCKS 1, 2 and 3 begin loading shift registers 646 A and B. SHIFT CLOCKS 1 and 2 form a two-phase clock for multiplexing, having a fundamental rate equal to SHIFT CLOCK 3. SHIFT CLOCK 4 is twice the frequency of SHIFT CLOCK 3 and permits parallel inputs which are received simultaneously from A and B multipliers 648 to output in series to Adders 368 I-X. At $t = 17$, MEMORY CLOCK loads POWER RETURN into output buffer 890.

DETAILED DESCRIPTION OF THE CIRCUIT ELEMENTS OF AZIMUTH BEAMSPREAD 260

The following detailed circuit description of FIGS. 5-8 discloses each component by function, input-output characters, or conventional nomenclature to enable one skilled in the arts of simulation, digital design, and computer programming to practice the invention. The components are designated by the manufacturer's IC type number from the following integrated circuit data books:

National Semiconductor Corporation, "Digital Integrated Circuits," January 1974;

Advanced Micro Devices, Inc., "Advanced Micro Devices Data Book," Copyright 1974;

Texas Instruments, Incorporated, "The TTL Data Book for Design Engineers," First Edition, Copyright 1973; and Fairchild Semiconductor, "TTL Data Book," June 1972

T:new buffer register 510 has a first stage of three 4 bit registers (74LS175) for providing T:new bar to adder 610; and a second stage of two 6 bit registers (74LS174) for providing T:new to MUX 614. The stages have common clocking, and simultaneously hold two sequential T:news to maintain sync between T:new and T:old.

Adder 610 has:
An input addition stage formed by four 4 bit adders (74283) for combining 12 bits of T:new data with 16 bits of T:old data;

A saturation stage formed by four 4 bit true compliment zero devices (74H87) for accommodating saturation, and a one dual four-to-one multiplexer (74153) for detecting overflow (or underflow) conditions; and A clocked output register stage formed by three 6 bit syncing registers (74LS174) for holding —(T:new - T:old).

MUX 614 is four quad two-to-one multiplexers (74S157).

T:old shift register 618 is 16 1 bit by 2048 bits dynamic shift registers (Am2527) clocked by T:old CLOCK 1 and 2 for holding an entire sweep of T:old data, with input and output buffering each provided by three 6 bit registers (74LS174) clocked by T:old CLOCK 3.

Update multiplier 634 has:

Six 512 by 4 bit PROMs (MM6306) for providing multiplexed lookup multiplication in whichbit partial product and the 8 LSB yield an 8 bit partial product;

Four 4 bit adders (74283) to combine the partial products;

Four 6 bit registers (74LS174) to provide intermediate buffering between the PROMs and the adders; and Input and output buffering each provided by three 6 bit registers (74LS174).

Adder 638 has:
An input addition stage formed by four 4 bit adders (74283);

A saturation stage formed by four 4 bit true compliment zero chips (74H87) for accommodation saturation. Saturation detection is accomplished by three inverters (74S04) and three 3 input NAND gates (74S10) which are connected to compare the MSB of each addends and the MSB of the sum; and Intermediate buffer stage provided by three 6 bit registers (74SL174).

Adder 640 has:
An input buffer stage formed by eight 6 bit registers (74SL174) for receiving two 16 bit and two 8 bit partial products from multiplier 648;

A first addition stage formed by four 4 bit adders (74283) for combining the two 16 bit partial products and two 4 bit adders (74283) for combining the two 8 bit partial products with carry;

A second addition stage formed by two 4 bit adders (74283) for combining the 8 LSB of the 16 bit sum and the 8 LSB of the 8 bit sum with carry;

A third addition stage formed by two 4 bit adders (74283) for combining the two carrys with the 8 MSB of the 16 bit sum; and A buffer stage formed by three 6 bit registers (74LS174) is provided between the second and third addition stage.

A and B output registers 644 I through X are each formed by three 6 bit registers (74LS174) to provide the A and B coefficients for simultaneously loading the A coefficients into shift register 646, terrain register 820, and buffer 710, and loading the B coefficients into shift register 646 and terrain register 820.

A and B shift registers 646 I through X are dynamic shift registers and buffers identical to register 618.

A and B multipliers 648 I through X are six 512 by 4 bit PROMs (MM6306) for providing multiplexed table lookup multiplication.

Buffer register 710 Even is six sets of three 6 bit registers (74SL174) for holding the output of even registers 644A.

Buffer register 710 Odd is five sets of four 4 bit registers (74LS175) for holding the outputs of odd registers 644A. The Q bar outputs are used to provide the negative twos compliment number. The required addition of one LSB per input is obtained within summation network 730A.

A Summation Network 730A includes:
A first tier of five sets of four 4 bit adders (74283) for adding even and odd terrain data A coefficients, with carry-in tied to one for supplying the required one in 710 Odd;

A second tier of three sets of five 4 bit adders (74283) for combining adjacent pairs of sums from the first tier plus the constant coefficient;

Two sets of five 4 bit adders (74283) for combining the three sums from the second tier, having a saturation circuit formed by four 74H87s, and one 74S153, one 74S40, one 74S260, and one 74S08 for accommodating overflow or underflow; and An intermediate buffer at the output of the second tier and after the saturation circuit by 74LS174s.

Multiplier 740 includes:

An input buffer similar to buffer 710 formed by five sets of three 6 bit registers (74LS174) and five sets of four 4 bit registers (74LS175);

A multiplication tier of ten sets of five 4 bit adders (74283) connected in accordance with Table I for generating the desired multiplication; and A summation network similar to network 730A without the saturation circuit and intermediate buffering.

$\pi/M$ multiplier 760 is six 512 × 4 PROMs (MM6306) for providing a 16 bit and an 8 bit partial products which are combined through four 4 bit adders (74283).

Output adder 770 is similar to adder 610.

Antenna register 810 is six sets of two 4 bit register files (74170) for receiving two antenna coefficients each, which are multiplexed into multiplier 840.

Terrain register 820 is six sets of four 4 bit tristate registers (DM8551) with outs wired together in pairs forming two 8 bit outputs for multiplexing into mulipiler 840.

Coefficient multiplier 840 is six sets of multipliers each including:

Four 512 × 4 PROMs (MM6306) for generating a partial product with outputs wired in pairs for multiplexing halves of partial product lookup tables;

Four 2 × 4 bit multipliers (AM25S05) with accumulation input, for summing partial products and completion of multiplication; and Intermediate buffer registers (74S174).

Product register 850 is formed by six sets of two 6 bit registers (74S174).

Summation network 860 is five sets of four 4 bit adders (74283) forming three summation tiers with intertier buffering (74S174) for summing six addends.

Adder 880 is four 4-bit adders (74283) for summing the two serial sums from network 860.

Accumulator 870 holds the first serial sum for subsequent addition to the second sum in adder 880, and includes:

Three 6 bit input registers (74S174);

Four quad 2-to-1 multiplexers (74S157) which multiplex the input register with zero for providing zero to adder 880 while the first sum is received, and for providing the first sum to adder 880 while the second sum is being added to the first sum generating an accumulated sum; and A saturation circuit similar to that in network 730A.

Output buffer 890 includes two multiplexed memory sections operating in a double buffering mode, each including:

Two memory cells having 16 1024 × 1 bit RAMs each;

Four quad 2-to-1 tristate multiplexers (74S257) for multiplexing the memory cell outputs; and Two sets of three 4 bit counters for addressing each cell.

We claim as our invention:

1. Apparatus for continuously convoluting at least two functions F1($x$) and F2($x$), at least one function of which is arbitrary, in response to F:new incremental data for the at least one arbitrary function, throughout an interval of consideration which incrementally advances along the at least one arbitrary function, comprising:

storage means for retaining the N$a$ plus N$b$ coefficients of the Fourier series:

$$F(x)j = \sum_{k=Ma}^{Na} (A_{k_j} \cos kx) + \sum_{k=Mb}^{Nb} (B_{k_j} \sin kx)$$

for each function over the interval of consideration wherein $j$ represents the incremental advancement;

computer means for providing the entity:

$$F:\text{old}j = \sum_{k=Ma:\text{old}}^{Na:\text{old}} (-1)^k A_{k_j} + \pi/M \sum_{k=Mb:\text{old}}^{Nb:\text{old}} (-1)^k kB_{k_j}$$

from the coefficients retained in the storage means where M is the number of increments $j$ within the interval of consideration;

input means for receiving F:new incremental data for the at least one arbitrary function as the interval of consideration incrementally advances;

A update means responsive to the computer means and the input means for providing the A update term:

$(-1)^n/n\pi$ (F:new - 2F:old) (sin $2\pi n/M$) to the at least one arbitrary function;

B update means responsive to the computer means and the input means for providing an update B term:

$(-1)^n n\pi$ (−F:new) (1-cos $2\pi n/M$) to the at least one arbitrary function;

convoluting means responsive to the coefficients in the storage means for convoluting the at least two functions F1($x$) and F2($x$) across the interval of consideration to provide:

$\int F1(x) F2(x) dx.$

2. The apparatus of claim 1 wherein $$F(x)j = A_{J_o} + \sum_{k=1}^{Na} (A_{k_j} \cos kx) + \sum_{k=1}^{Nb} (B_{k_j} \sin kx)$$

3. The apparatus of claim 2, wherein the interval of consideration is from $-\pi$ to $+\pi$.

4. The apparatus of claim 3 wherein $$F:\text{old}(\pi)_j = A_{o_j} + \sum_{k=Ma:\text{old}}^{Na:\text{old}} (-1)^k A_{k_j} + \pi/M \sum_{k=Mb:\text{old}}^{Nb:\text{old}} (-1)^k k B_{k_j}$$

5. The apparatus of claim 4 wherein $$F:\text{old}(\pi)_j = A_{o_j} + \sum_{k=1}^{Na} (-1)^k A_{k_j} + \pi/M \sum_{k=1}^{Nb} (-1)^k kB_{k_j}$$

6. An azimuth beamspread subsystem responsive to range point data T:new from a digital radar system which defines a family of R range arc functions T($x$) for generating range arc update entity T:old and distributing the effect of T:new introduced each sweep in accordance with an antenna gain function G($x$) across at least the displayed portion of the associated range arc in a display device, the subsystem comprising:

- T(x) memory means for storing the coefficients of a family of truncated Fourier series representing at least the displayed portions of the family of R functions T(x);
- T:old calculator means responsive to the coefficients stored in the T(x) memory means for providing a T:old associated with new T:new;
- T(x) update means responsive to T:new and T:old for updating the coefficients within the memory means to maintain the correspondence between each of the R Fourier series and the range arc represented thereby;
- G(x) memory means for storing the coefficients of a truncated Fourier series representing gain function G(x); and
- integrator means responsive to the T(x) memory means and the G(x) memory means for providing the integral of T(x) and G(x) dx.

7. The subsystem of claim 6, wherein the T(x) memory means is a memory matrix R terms long by (Na + Nb) terms wide where Na is the number of cosine terms in each of the R Fourier series and Nb is the number of sine terms in each of the R Fourier series.

8. The subsystem of claim 7, wherein Na = Nb = N and the T(x) memory matrix is R by 2N.

9. The subsystem of claim 6, wherein the T(x) memory means is a memory matrix R terms long by (Na + Nb + C) terms wide where C is the constant term of each of the R Fourier series.

10. The subsystem of claim 9, wherein the memory matrix is (Na + Nb) shift registers wide each of which is R bits long.

11. The subsystem of claim 7, wherein the memory matrix is Na + Nb + C shift registers wide each of which is R bits long.

12. The subsystem of claim 6, wherein $$T(x)j = A_{o_j} + \sum_{Ma}^{Na} A_{k_j} \cos kx + \sum_{Mb}^{Nb} B_{k_j} \sin kx;\text{ and}$$

$$G(x) = A_{o_g} + \sum_{Mc}^{Nc} A_{i_g} \cos ix + \sum_{Md}^{Nd} B_{i_g} \sin ix$$

13. The subsystem of claim 6, wherein G(x) is a symmetrical function and requires only cosine terms.

14. The subsystem of claim 6, wherein the antenna gain function G(x) is variable, and further comprises:
- G(x) update means for entering update coefficients of the G(x) Fourier series into the G(x) memory means at least once each radar antenna sweep.

15. The subsystem of claim 6, wherein T:old of the next radar antenna sweep is formed by summing and weighting the T(x) coefficients of the current radar antenna sweep.

16. The subsystem of claim 15, wherein $$T\text{:old} = A_{o_j} + \sum_{k=1}^{Na} (-k)^k A_{k_j} + \pi/M \sum_{k=1}^{Nb} (-1)^k B_{k_j}$$

where M is the number of sweeps within the antenna gain function.

17. The subsystem of claim 16, wherein M is the number of sweeps within the most significant portion of G(x).

18. The subsystem of claim 6, wherein the integrator means provides:

$$1/2\pi \int_{-\pi}^{\pi} G(x) T(x) dx$$

19. The subsystem of claim 18, wherein the integrator means provides:

$$A_{o_g} A_{o_j+1} + 1/2 \sum_{n=1}^{N} (A_{n_g} A_{n_j+1} + B_{n_g} B_{n_j+1})$$

* * * * *